United States Patent [19]

Markfort

[11] 4,418,545

[45] Dec. 6, 1983

[54] REABSORPTION METHOD FOR TEMPERATURE TRANSFORMATION OF HEAT AND APPARATUS THEREFORE

[76] Inventor: Dieter Markfort, Am Tor 2, 5064 Rösrath 3, Fed. Rep. of Germany

[21] Appl. No.: 337,398

[22] Filed: Jan. 6, 1982

[30] Foreign Application Priority Data

Jan. 8, 1981 [DE] Fed. Rep. of Germany ....... 3100348

[51] Int. Cl.$^3$ .............................................. F25B 15/00
[52] U.S. Cl. ...................................... 62/101; 62/114; 62/238.3; 62/476
[58] Field of Search .............. 62/476, 484, 114, 238.3, 62/101

[56] References Cited

U.S. PATENT DOCUMENTS

| | | | |
|---|---|---|---|
| 4,167,101 | 9/1979 | Rojey | 62/114 X |
| 4,299,093 | 11/1981 | Cohen et al. | 62/101 |
| 4,341,084 | 7/1982 | Rojey et al. | 62/238.3 X |

OTHER PUBLICATIONS

Handbuch der Kaeltetechnik, BD VII (Handbook of Refrigeration and Cryogenics, vol. VIII), by R. Planck, Springer-Verlag, Berlin, West Germany, 1959, pp. 16-18.

"Arbeitsgemische für Sorptionswarmepumpen", K. Stephan/D. Seher, Engineering Paper Ki Klima—Kalte—Hertzung 1/1980.

*Primary Examiner*—Lloyd L. King
*Attorney, Agent, or Firm*—Holman & Stern

[57] ABSTRACT

A reabsorption method and apparatus for transforming low temperature heat into medium temperature heat by utilizing the energy of high temperature heat. This system utilizes non-adiabatic, differential desorption and absorption and internal heat transfer between the two reactions while being operated by a single solution pump only. A desorber, absorber and solution recuperator of a first loop are integrated to form one unit while a reabsorber, degasser and solution recuperator of a second loop are integrated to form a second unit.

15 Claims, 4 Drawing Figures

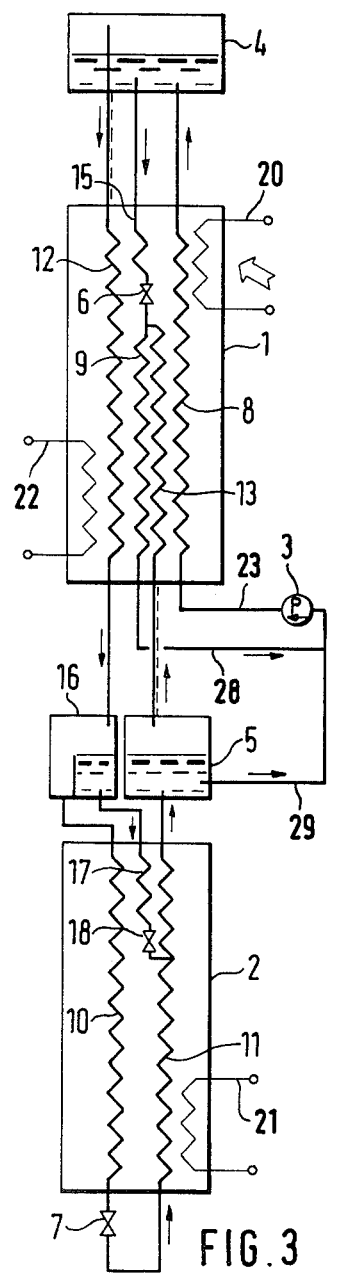
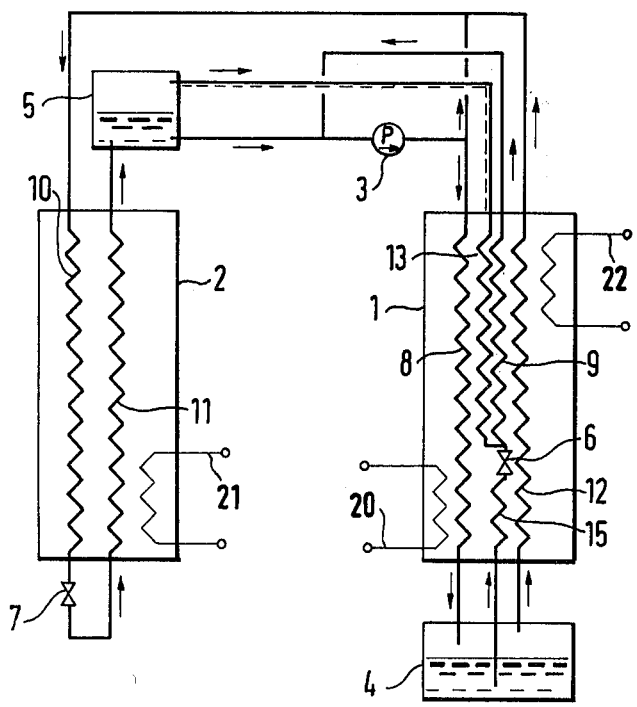
FIG. 3
FIG. 4

REABSORPTION METHOD FOR TEMPERATURE TRANSFORMATION OF HEAT AND APPARATUS THEREFORE

BACKGROUND OF THE INVENTION

Thermodynamics of multi-component mixtures offers a means for operating heat-transformation systems applied to refrigeration or heating service. Due to pressure/concentration/temperature relations of solutions, composed of a working agent and a solvent, the latent heat of vaporization and condensation of the working agent can be utilized for temperature transformation of heat-fluxes.

Reabsorption systems of presently available designs make use of the functional relationship between pressure and temperature while concentration within a loop varies to a minor extent only. Therefore, two separate fluid loops have to be installed in order to adjust heat and mass balances as the former have to be operated under different concentration levels according to their temperature levels. This results in a relatively high investment in machinery, controls and components.

An example of a known reabsorption system is shown in Handbuch der Kaeltetechnik, Bd. VII (Handbook of Refrigeration and Cryogenics, Vol. VII), by R. Planck, Springer-Verlag, Berlin, West Germany, 1959, pp. 16–18.

In addition to the above mentioned desorber, absorber, reabsorber and degasser, two solution recuperators are required, which is responsible for the poor performance and the rather restricted application of such plants.

Furthermore, the operation parameters are strictly coupled to each other, e.g. by specifying the extreme temperature levels the intermediate temperature and pressure levels are fixed.

BRIEF SUMMARY OF THE INVENTION

The present invention makes use of the temperature/concentration relationship of solutions at fixed pressure levels. This implies adopting the principles of non-adiabatic, differential desorption and absorption and internal heat transfer between the two reactions. By virtue of this method the present readsorption system is being operated by one solution pump only. A desorber, absorber and solution recuperator of a first loop are integrated to form one unit while a reabsorber, degasser and solution recuperator of a second loop are integrated to form a second unit.

A high degree of flexibility in operating parameters is achieved with this invention and a reduction in apparatus, controls and components.

This invention provides a reabsorption system, designed to transform low temperature heat into medium temperature heat by utilizing the energy of high temperature heat, which incorporates two fluid loops as ducts for the solution of a working agent and a solvent. The working agent is to be desorbed from the solution of said first loop within a desorber, the latter being a component of the high pressure side of said first loop, and will be reabsorbed by the solution of said second loop within a reabsorber, the latter being a component of the high pressure side of said second loop, and after depressurization is to be desorbed from the solution of said second loop within a degasser, the latter being a component of the low pressure side of said second loop, and will be absorbed by the depressurized solution of said first loop within an absorber, the latter being a component of the low pressure side of said first loop.

The process involved, according to the thermodynamics of two component mixtures, shows endothermic reaction heat for desorption and degassing and exothermic reaction heat for absorption and reabsorption.

The invention is a reabsorption system, which requires one solution pump only and a reduced number of components by integrating their functions, gives more versatility in combining operation parameters, and provides a higher efficiency.

In order to achieve the above purposes of the invention the difference in characteristic temperature levels is covered by variation of solution concentration, with only minor pressure differences, adopting the principles of non-adiabatic, differential desorption and absorption, by combining desorber and absorber to form an integrated unit DA and by combining reabsorber and degasser to form another integrated unit RE each of them having internal thermal contact, and by collecting the two separate solution-loops into one duct upstream of a common solution-pump, as the solutions of both loops have identical pressure, temperature and concentration at the exits of absorber and degasser resp., and by diverging said common duct downstream of said pump.

The plant concept according to the invention is widely unaffected by the pressure level as the difference in characteristic temperature levels is covered by concentration variation of the two solution loops whereas the pressure difference is solely linked to the temperature drop and temperature rise of the external heat sources respectively.

The extreme temperatures are limited by the vapor pressures of the pure solution constituents only. The intermediate characteristic temperature level may be chosen anywhere between the extreme values. This fact is of prime interest as it allows for operating conditions which alternatively can only be achieved by multiple stage cascades with conventional systems. The concept according to the present invention offers a further advantage in that theoretically a heat ratio equivalent to that of a Carnot process can be obtained; i.e. the efficiency factor may attain the value of "one".

The primary source of energy losses are the temperature gradients, necessary for heat transfer within the integrated units, the design of which should be optimized with respect to heat transfer surface and arrangement. Heat transfer equipment capable to meet the requirements for this invention has been described in related U.S. patent application Ser. No. 000,705, filed Jan. 3, 1979. Since two of the known components of each loop are combined into one integrated unit, which simultaneously incorporates the solution recuperator, the amount of hardware will be reduced, even though the heat fluxes increase.

In a further embodiment of the invention it is proposed to recirculate the senisble and latent heat of the working agent vapor, which has been desorbed from the desorber solution to the desorber, by incorporating a vapor cooler in the DA unit with thermal contact to said desorber and guiding the vapor in counterflow to the desorber solution. This gives rise to appreciable amounts of heat being recycled and a reduced external energy input.

The principles of non-adiabatic, differential desorption and absorption respectively require a local equilibrium in temperature and concentration of both fluid and vapor phases. In some cases this is hard to achieve from the design point of view, mainly when different fluids have to be collected, e.g. at the inception of the absorption and reabsorption process. In order to avoid mixing losses both fluids should have obtained the same temperature, preferably the boiling temperature, at the junction.

Therefore a preferred arrangement of the plant system according to the invention is to have the low pressure working agent vapor preheated within the integrated desorber/absorber unit (DA) up to the temperature of a selected mixing point with the absorber solution, by means of a preheater.

Analogously, losses due to concentration differences of two fluid phases have to be anticipated when mixing vapor and solution upstream of the reabsorber, as the vapor desorbed from the desorber and having passed the aforementioned vapor cooler will be in equilibrium with a fluid phase whereas the reabsorber solution will be present in a subcooled state.

In order to avoid these mixing losses, preheating of the reabsorber solution to boiling temperature within the DA is proposed by branching off said reabsorber solution at an appropriate location from the desorber flow via a separate duct.

As the working agent vapor leaving the desorber may contain appreciable amounts of solvent vapor, as it has been desorbed at up to maximum process temperature, the concentration required for proper operation of the degasser at very low temperatures may not be attainable. Therefore, at moderate temperatures, part of the liquid phase, which contains most of the condensed solvent vapor, should be extracted from the vapor line.

In order to avoid evaporation (and loss of temperature) of this liquid, subcooling before depressurization may be advisable, in case the difference between high and low pressure is not negligible.

In accordance with another embodiment of the reabsorption system of the present invention, there may be provided a header in the high pressure vapor line, a drain for the liquid phase, a subcooler and a throttling device connected to the low pressure side, the subcooler either being part of the integrated unit DA or being part of the integrated unit RE.

A refinement of the invention which may be advantageously adopted when the pressure difference, due to increased temperature span of the external heat sources, is not negligibly small, is characterized by subcooling the absorber solution before depressurizing it in a solution cooler and recycling the heat to the desorber. As the solution leaving the desorber is under boiling conditions any depressurization would cause evaporation and temperature drop. By subcooling the fluid to a temperature which corresponds to the boiling temperature under reduced pressure this loss of energy can be avoided.

A further advantageous embodiment of the reabsorption system according to the invention is achieved, adopting the process of non-adiabatic, differential rectification for the vapor released from the desorber, by designing said vapor cooler as a distillation column, typical operational principles of which are the subject of U.S. patent application Ser. No. 000,705, referred to above. The vapor leaving said column is free of a fluid phase; therefore no mixing losses, as mentioned above, are to be expected. Moreover, extending the operating conditions to lower extreme temperatures is possible. Concentration of the solution of the second loop, entering the reabsorber, may be increased up to the pure working-agent, which in turn would include the proper absorption system as a limiting case.

Therefore a system is proposed in which the vapor cooler is designed as a rectifier being an integral part of the unit DA.

BRIEF DESCRIPTION OF THE DRAWINGS

The invention will be described more specifically with reference to the attached drawings wherein;

FIG. 3 is a modified arrangement of FIG. 2 incorporating solvent extraction from the high-pressure vapor, and FIG. 4 is a schematic diagram of the invention in a system which is based on rectification of the working agent vapor.

DETAILED DESCRIPTION

Figure 1:
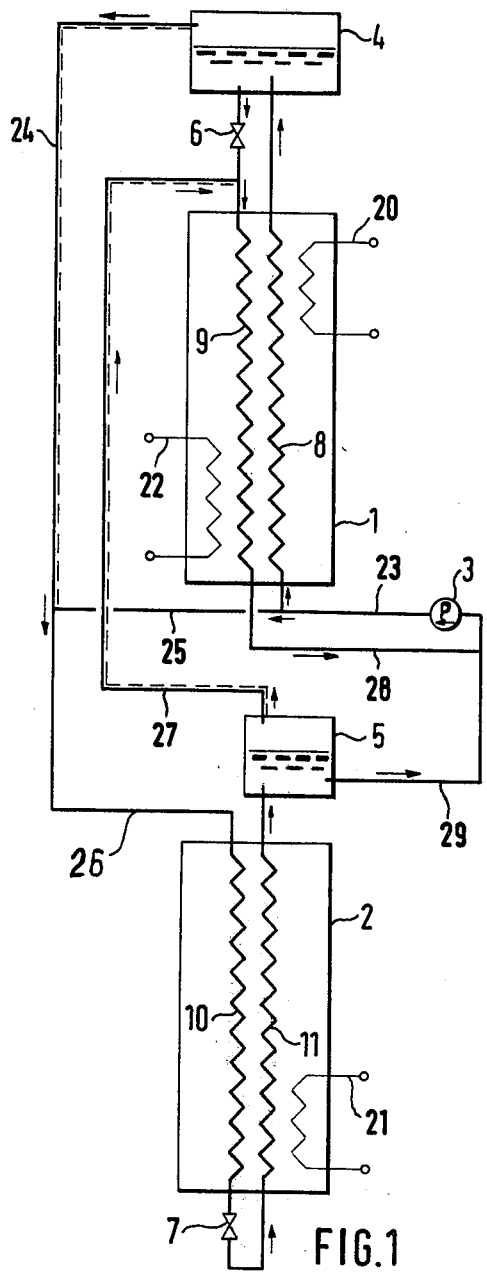
FIG. 1 is a schematic diagram of a simple reabsorption system according to the invention, in order to explain the thermochemical process.

FIG. 1 shows the details of a reabsorption system in which process equipment of known systems has been integrated to form the desorber/absorber unit (DA) 1 and the reabsorber/degasser unit (RE) 2. In order to perform the required function, transfer of heat across the confinement, each of the components has to be split into a number of ducts which have thermal contact with corresponding ducts of the counterpart within the units.

Thus the flow ducts of the desorber 8 are thermally coupled to those of the absorber 9, whereas the flow ducts of the reabsorber 10 are in thermal contact with those of the degasser 11.

The DA unit 1 is the main part of the first solution circuit while the RE unit 2 forms the essential part of the second solution circuit. Both loops are energized by a common solution pump 3.

Working agent vapor and solvent fluid are separated by means of a high pressure header 4 and low pressure header 5. The solvent leaving the high pressure header 4 will be depressurized by a throttle valve 6 while the highly concentrated solution of the second circuit passes the expansion valve 7 in order to reduce its temperature by vaporization in part.

Further details, e.g. flow adjustment valves, which do not directly pertain to the invention have been omitted from the block-diagram.

The exothermic reaction heat of absorption and reabsorption is directly utilized as endothermic reaction heat for desorption and degassing respectively by heat transfer from absorber ducts 9 to desorber ducts 8 and from reabsorber ducts 10 to degasser ducts 11. Heat transfer takes place at the local temperature level of the respective cross-section of the integrated unit DA or RE.

External heat of maximum system temperature, added at the top end of unit 1 (DA) by heating duct 20 supplies the energy necessary for transforming the heat of minimum temperature, added at the bottom end of unit 2 (RE) by heating duct 21 into heat of medium temperature, both amounts of heat to be extracted at the bottom end of unit 1 (DA) by heat removal duct 22.

The solution pumped by the pump 3 through line 23 diverges upstream of the desorber 8. The primary loop part of it will be heated up in the desorber 8 and working agent vapor formed will be separated in header 4. The residual solution enters the absorber 9 via the throttling device 6.

The working agent vapor leaving header 4 in line 24 is combined with the secondary loop part of the solution from pump 3 in line 25 upstream of the reabsorber 10 where the vapor will be reabsorbed as the temperatures decrease.

The highly concentrated solution leaving the bottom end of the reabsorber 10 will be depressurized when passing through expansion valve 7 and undergoes a desorption process while passing through the degasser 11. Vapor separation takes place in header 5 and the vapor leaving header 5 through line 27 is combined with the primary loop solution from header 4 downstream of throttle valve 6 and will be absorbed in the solution in the absorber 9 as the temperatures decrease. The solution leaving the bottom end of the absorber 9 in line 28 joins that leaving header 5 in line 29 upstream of the solution pump 3.

Figure 2:
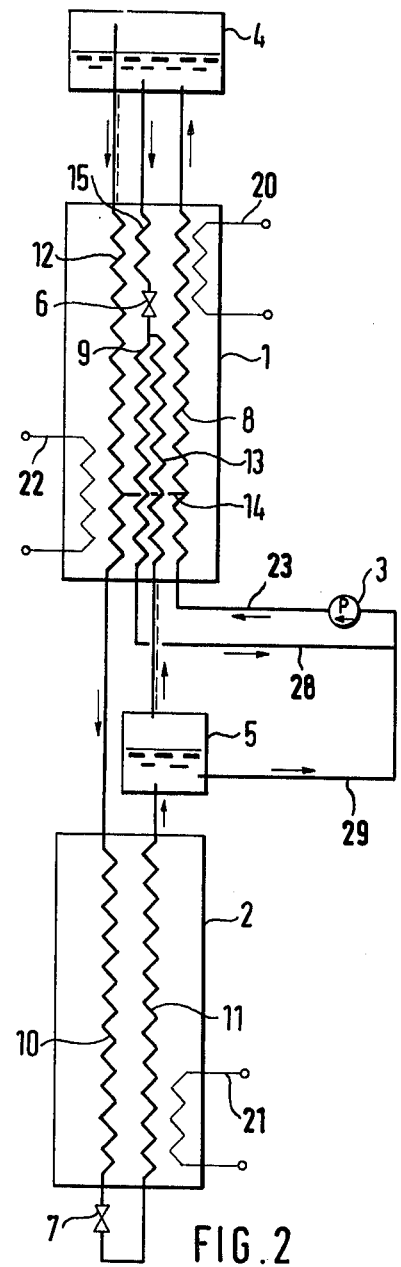
FIG. 2 is a schematic diagram of an embodiment of the invention which comprises all of the improvements, except rectification and solvent extraction, proposed.

A schematic diagram of a modified plant according to further improvements of the invention is shown in FIG. 2. In this embodiment the working agent vapor extracted from header 4 is conducted via a vapor cooler 12 through unit 1 as an integral part thereof and mainly transfers heat to the desorber 8. The working agent vapor extracted from header 5 passes through a preheater 13, which is designed as part of unit 1 and is in thermal contact with the absorber 9. The solution leaving header 4 passes through a solution cooler 15 releasing sensible heat to the upper part of desorber 8 before being depressurized by passing through throttle 6. In order to preheat the solution of the second circuit to boiling temperature before mixing it with the vapor leaving header 4 the flow is branched off at an appropriate location within unit 1 via a separate duct 14.

The block diagram shown in FIG. 3, which incorporates solvent extraction from the vapor line, shows an embodiment of the invention which exemplifies another possible arrangement of components. The mixture of vapor and liquid leaving the vapor cooler 12 is separated by means of a header 16. Part of the liquid is passed through a subcooler 17. A throttle valve 18 connects the subcooler 17 to the degasser 11. The block diagram of FIG. 4 shows a further embodiment of the system wherein a rectification device differs from that of FIG. 2 in only one respect, viz, the vapor cooler 12 is operated as a rectifier. Therefore, unit 1 has to be inverted.

Examples of compatible solutions which can be used as working agents and solvents in carrying out the invention are shown in the table below, although others may be used as well.

| Working Agent | Solvent |
| --- | --- |
| ammonia (NH3) | water (H2O) |
| difluoromonochloromethane (R22) | tetraethyleneglycoldimethyl ether (E 191) |
| methylomin | water |
| water | lithium bromide |
| methanol | methanol-lithium bromide |
| ammonia | ammonium-lithiumnitrate |
| ammonia | sodium throcyanide |
| methanol | water |
| methanol | dimethylformamid |
| methanol | tetraethyleneglycol dimethyl ether (E 181) |
| difluoromonochloromethane (R22) | dimethylformamid |

I claim:

1. In a reabsorption process for transforming low-temperature heat into medium temperature heat by utilizing the energy of high temperature heat, incorporating two fluid loops wherein solutions of a working agent and a solvent are passed through, the working agent is desorbed from the solution in the first loop within a desorber, the latter being a component of the high pressure side of the first loop, and reabsorbed by the solution in the second loop within a reabsorber, the latter being a component of the high pressure side of the second loop, and after depressurization is desorbed from the solution in the second loop within a degasser, the latter being a component of the low pressure side of the second loop, and absorbed by the depressurized solution of the first loop within an absorber, the latter being a component of the low pressure side of said first loop, the improvement, whereby a difference in characteristic temperature levels is covered by variation of solution concentration, with only minor pressure differences, utilizing the principles of non-adiabatic, differential desorption and adsorption, comprising, combining the desorber and absorber to form a first integrated unit, combining the reabsorber and degasser to form a second integrated unit each of them having internal thermal contact, joining said two separate solution loops into one duct upstream of a common solution pump, maintaining solutions of both loops at identical pressure, temperature and concentraction at the exits of the absorber and degasser, and diverging said common duct downstream of said pump.

2. Reabsorption process according to claim 1 and further comprising recycling the sensible and latent heat of the working agent, which has been desorbed from the desorber solution, to the desorber by passing said working agent through a vapor cooler in the desorber-/absorber unit in thermal contact with said desorber while guiding the vapor in counter flow to the desorber.

3. Reabsorption process according to claim 2 and further comprising preheating the low pressure working agent within the integrated desorber/absorber unit up to the temperature of a selected mixing point with the absorber solution by means of a preheater.

4. Reabsorption process according to claim 2 and further comprising preheating the reabsorber solution to boiling temperature within the integrated component desorber/absorber by branching off said reabsorber solution at an appropriate location from the desorber flow via a separate duct.

5. Reabsorption process according to claim 2 and further comprising separating the mixture from the vapor cooler into vapor and liquid in a header in the high pressure vapor line, subcooling part of the liquid in a subcooler, passing said liquid through a throttling device and connecting the high pressure vapor line to the low pressure side of said device said subcooler being part of the integrated reabsorber/degasser unit.

6. Reabsorption process according to claim 2 and further comprising subcooling and depressurizing the solution before entering the absorber, and recycling the heat to the desorber.

7. Reabsorption system according to claim 2 and further comprising utilizing the vapor cooler as a distillation column as an integral part of said desorber/absorber.

8. In a reabsorption apparatus wherein low temperature heat is transformed into medium temperature heat by utilizing the energy of high temperature heat, which includes two fluid loops in the form of ducts for the solution of a working agent and a solvent, the working agent is desorbed from the solution in a first loop within a desorber, the latter being a component of the high pressure side of the first loop, and reabsorbed by the solution in a second loop within a reabsorber, the latter being a component of the high pressure side of the second loop, and after depressurization in a depressurizer is desorbed from the solution of the second loop within a degasser, the latter being a component of the low pressure side of the second loop, and absorbed by the depressurized solution of the first loop within an absorber, the latter being a component of the low pressure side of the first loop, the improvement, whereby a difference in characteristic temperature levels is produced by variation of solution concentration with only minor pressure differences, utilizing the principles of non-adiabatic, differential desorption and absorption, comprising, a desorber and an absorber combined in a first integrated unit with internal thermal contact therebetween, a reabsorber and degasser combined in a second integrated unit with internal thermal contact therebetween, a first header means having an inlet, a solution outlet and a working agent outlet, the outlet of said degasser being connected to said inlet of said first header means, first duct means to which the outlet of said absorber and said solution outlet of said first header means are connected, a common solution pump having its inlet connected to said first duct means, the solutions of both loops having identical pressure, temperature and concentration at said outlets of the absorber and degasser, second duct means connected at one end to the outlet of said pump and at the other end of the inlets of the desorber and reabsorber respectively.

9. Reabsorption apparatus according to claim 8 and further comprising a second header means having an inlet, a solution outlet, and a working agent outlet, third duct means connecting the outlet of said desorber to said inlet of said second header, fourth duct means connecting said second header solution outlet of the inlet of said absorber, fifth duct means connecting said second header working agent outlet to the inlet of said reabsorber, sixth duct means connecting the outlet of said reabsorber to the inlet of said degasser, and seventh duct means connecting the outlet of said degasser to said first header means.

10. Reabsorption apparatus according to claim 9 and further comprising a working agent cooler in said first integrated desorber/absorber unit having its inlet connected to said working agent outlet of said second header, and means for guiding the working agent in counter flowing thermal contact with the desorber for recycling the sensible and latent heat of the working agent, which has been desorbed from the desorber solution, to the desorber.

11. Reabsorption apparatus according to claim 10 and further comprising a preheater within said integrated desorber/absorber having its inlet connected to said working agent outlet of said first header means for preheating the low pressure working agent vapor up to the temperature of a selected mixing point with the absorber solution.

12. Reabsorption apparatus according to claim 10 and further comprising an eighth duct means connecting said working agent cooler with said desorber within said integrated desorber/absorber unit at an appropriate location for preheating the reabsorber solution.

13. Reabsorption apparatus according to claim 10 and further comprising a third header means having an inlet, a solution outlet and a working agent outlet, a ninth duct means connecting the outlet of said working agent cooler to said inlet of said third header means, a tenth duct means connecting said working agent outlet of said third header means to the inlet of said reabsorber, a subcooler within said integrated reabsorber/degasser unit, eleventh duct means connecting said solution outlet of said third header means to the inlet of said subcooler, a throttle valve having its inlet connected to the outlet of said subcooler and its outlet connected to said degasser at a location between the ends thereof.

14. Reabsorption apparatus according to claim 10 and further comprising a twelfth duct means connecting the outlet of said cooler to the inlet of said desorber.

15. Reabsorption apparatus according to claim 10 and further comprising a solution cooler within said first integrated unit, thirteenth duct means connecting the solution outlet of said second header to the inlet of said solution cooler and a throttling device within said first integrated unit having its inlet connected to the outlet of said solution cooler and its outlet connected to the inlet of said absorber.

* * * * *